April 1, 1924.                                                                 1,488,640
F. M. HOLDEN
BALANCING MEANS FOR MULTIPLE CYLINDER ENGINES
Filed March 13, 1920

Inventor
Fern M. Holden
By Blackmore, Spencer & Flint
Attorneys

Patented Apr. 1, 1924.

1,488,640

UNITED STATES PATENT OFFICE.

FENN M. HOLDEN, OF DETROIT, MICHIGAN, ASSIGNOR TO GENERAL MOTORS CORPORATION, OF DETROIT, MICHIGAN, A CORPORATION OF DELAWARE.

BALANCING MEANS FOR MULTIPLE-CYLINDER ENGINES.

Application filed March 13, 1920. Serial No. 365,585.

*To all whom it may concern:*

Be it known that I, FENN M. HOLDEN, a citizen of the United States, and a resident of Detroit, county of Wayne, and State of Michigan, have invented certain new and useful Improvements in Balancing Means for Multiple-Cylinder Engines, of which the following is a full, clear, concise, and exact description, such as will enable others skilled in the art to which the invention relates to make and use the same, reference being made therein to the accompanying drawings, which form a part of this specification.

This invention relates to means for balancing multiple cylinder engines of the reciprocating type or other dynamically unbalanced systems of similar character, and, while not limited thereto, it is of particular utility in connection with engines designed for use in the propulsion of motor vehicles.

The proper balancing of motor vehicle engines of the internal combustion type is becoming of increasing importance in view of the extremely high speeds at which such engines are designed to operate in accordance with modern practice.

The object of my invention is to devise a balancing means whereby what is known as "secondary" balancing of the engine may be accomplished in a simple and efficient manner. More particularly my invention has in view the provision of means for counterbalancing the forces due to reciprocating masses in the eight-cylinder engine having cylinders at 60°, or in any other combination of cylinders in which the radius-vector representing the resultant of the forces at any moment sweeps out an approximate circle.

It is a well-known fact that the inertia forces due to the movement of the reciprocating masses of the engine may be expressed approximately by the following formula;

$$\text{Force} = mw^2 r (\cos=\theta + B_2 \cos=2\theta + B_4 \cos 4\theta + \ldots \ldots)$$

in which $m$ and $r$ are respectively mass and length of crank, $w$ is the angular velocity, $\theta$ the crank angle, and $B_2$, etc., are coefficients whose values depend upon the length of crank and connecting rod. It is also well known that the forces represented by the first term, which are called the "primary" inertia forces, are balanced in the usual arrangement of the four-cylinder engine with cranks at 180°, and that the forces of a higher order than those represented in the second term may be regarded as negligible at practicable engine speeds. The "secondary" inertia forces, however, i. e. those represented by the second term, are not balanced in the ordinary engines, wherein the cranks are arranged in a single plane, and it is these forces amounting to a comparatively large fraction of the primary forces that cause the vibration produced when the engine is running with the car at rest.

It will be seen from the formula that the unbalanced secondary force is proportioned to the cosine of twice the crank angle. Its value at any instant is the projection on the line of stroke of a centrally directed force rotating at a speed twice that of the crank. It may therefore be considered as due to the simple harmonic motion of a mass driven from an imaginary crank revolving at twice the speed of the actual crank.

With this principle as a basis I have devised a means whereby the secondary balance of a V-type engine having the blocks set an an angle of approximately sixty degrees may be obtained by a single rotating mass which may be appropriately driven at twice the speed of the crank shaft.

In the accompanying drawings, in which is illustrated one form of mechanism, embodying the principles of the invention:

Figure 1:
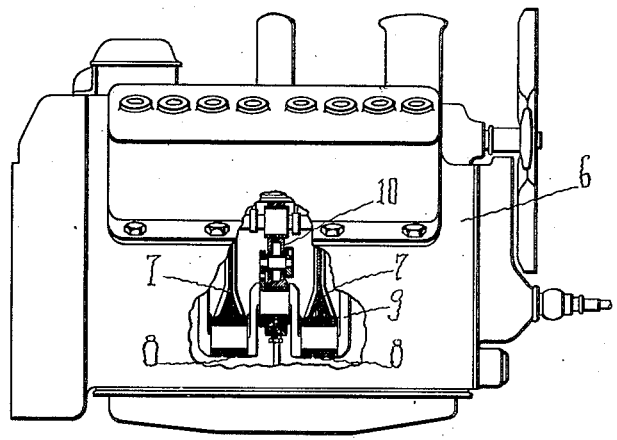
Fig. 1 is a side elevation partly in section, of an eight-cylinder, 60°, V-type engine with balancing mechanism applied thereto.
Figure 2:
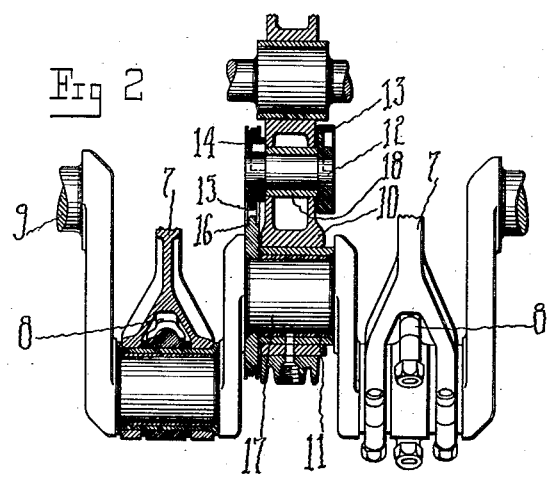
Fig. 2 is an elevation on a larger scale of a portion of the structure shown in Fig. 1.
Figure 3:
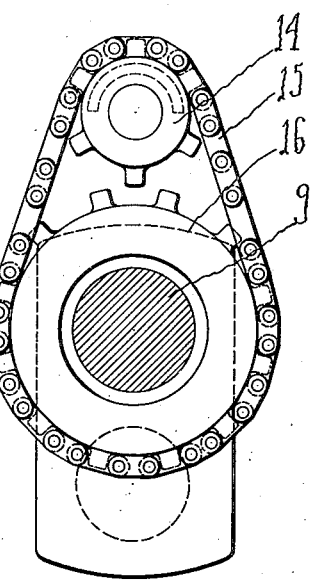
Fig. 3 is an end view of the balancing mechanism.
Figure 4:
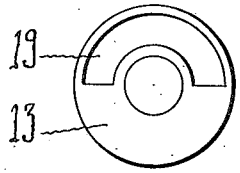
Fig. 4 is a view of the element employed as a counterbalance.
Figure 5:
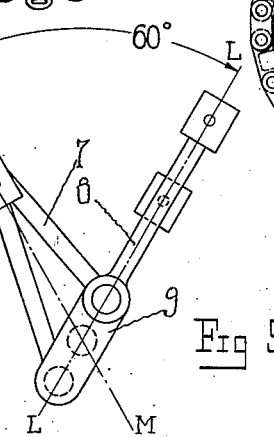

Fig. 5 a diagrammatic view of the moving masses of the engine.

In the drawings, 6 indicates an internal combustion engine of the V-type, the connecting rods 7, of one block, and 8, of the other, being connected to the one crank shaft 9 in the usual manner. In the frame 10 of the engine, preferably adjacent the intermediate crank shaft bearing 11, is the bearing 18 in which is journaled shaft 12, carrying at one end the counterbalance 13 and at the other the sprocket 14. The sprocket is arranged to be driven at twice the speed of the crank shaft by chain 15 passing over sprocket 16 secured to the crank shaft at one end of the journal 17.

The counterbalance 13 may be of any desired form but is shown as being in the shape of a disc with one side hollowed out as at 19.

The engine, as shown in Fig. 5, has the two blocks so arranged that the angle between the axes of the cylinders shall be 60°. As above pointed out the action of the unbalanced secondary forces due to the pistons in the plane L L can be represented by a simple harmonic motion of frequency twice that of the crank shaft. Similarly, the pistons acting in plane M M tend to set up harmonic motion of the same frequency as that of the pistons in plane L L, but differing in phase by 60°. When these two approximate simple harmonic motions are combined it will be seen that their resultant is substantially constant in magnitude and will vary in direction practically uniformly at twice the angular velocity of the crank shaft. Such forces, therefore, may be counterbalanced by the rotation of an unbalanced mass at twice crank shaft speed and in the same direction as the crank shaft, with a counterweight of proper magnitude and timed so as to differ in phase with the unbalanced inertia force by 180 degrees.

It will be understood that the embodiment of my invention described above, while simple and effective, is merely illustrative and that various changes may be made within the spirit and scope of the invention. Other forms of gearing may readily be applied for the purpose of driving the auxiliary or counterbalancing shaft, and the counterbalancing mass may be distributed between two or more shafts instead of being placed on one shaft only. As to the location of the unbalanced shaft, it may also be advantageously placed concentrically with the crank shaft instead of with the arrangement shown. It will also be understood that, while I have referred to the angle between the cylinder blocks as 60°, the invention will be applicable to engines in which the angle varies from that mentioned, the balancing effect becoming more nearly perfect as the angle approaches 60°.

I claim:

1. In combination, a reciprocating engine having two blocks of cylinders arranged at an angle of approximately 60° and with a common crank shaft, said engine having the primary inertia forces substantially in balance, and means for balancing the secondary inertia forces comprising a unitary unbalanced body, rotatively supported and arranged to be driven at twice the speed of the said crank shaft, and in a plane at right angles to the axis thereof.

2. In combination, a reciprocating engine comprising two blocks of four cylinders each, arranged at an angle of approximately sixty degrees, with a common crank shaft, and a balancing device arranged to be rotated by said engine at a speed twice that of the said crank shaft and in a plane at right angles thereto.

3. In combination, a reciprocating engine comprising two blocks of cylinders arranged at an angle of approximately sixty degrees, and means adapted and arranged to balance the secondary inertia forces of the reciprocating parts of the engine comprising an unbalanced body rotatively mounted adjacent to the rotating engine shaft on an axis parallel thereto and means for rotating said body in the direction of rotation of the said shaft at twice the speed thereof.

In testimony whereof I affix my signature.

FENN M. HOLDEN.